US008369509B2

(12) United States Patent
Jennings (10) Patent No.: US 8,369,509 B2
(45) Date of Patent: Feb. 5, 2013

(54) SYSTEM AND METHOD FOR SEARCH-BASED WORK ASSIGNMENTS IN A CONTACT CENTER

(75) Inventor: Terry Don Jennings, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 30 days.

(21) Appl. No.: 13/113,358

(22) Filed: May 23, 2011

(65) Prior Publication Data

US 2012/0300921 A1 Nov. 29, 2012

(51) Int. Cl.
*H04M 3/00* (2006.01)
*H04M 5/00* (2006.01)

(52) U.S. Cl. ......... 379/265.12; 379/265.02; 379/265.05; 379/265.11

(58) Field of Classification Search ............. 379/265.12, 379/265.11, 265.02, 265.01, 265.05, 266.01
See application file for complete search history.

(56) References Cited

U.S. PATENT DOCUMENTS

| | | | |
|---|---|---|---|
| 6,337,858 B1 * | 1/2002 | Petty et al. | 370/356 |
| 6,798,876 B1 | 9/2004 | Bala | |
| 7,231,034 B1 | 6/2007 | Rikhy et al. | |
| 7,406,515 B1 | 7/2008 | Joyce et al. | |
| 7,650,331 B1 | 1/2010 | Dean et al. | |
| 7,787,609 B1 | 8/2010 | Flockhart et al. | |
| 7,961,866 B1 | 6/2011 | Boutcher et al. | |
| 2008/0147470 A1 | 6/2008 | Johri et al. | |
| 2009/0190744 A1 | 7/2009 | Xie et al. | |

FOREIGN PATENT DOCUMENTS

WO 99/14920 3/1999

OTHER PUBLICATIONS

Patent Application No. GB1122376.5, Avaya Inc., Great Britain Office Action dated Apr. 27, 2012, 9 pages.
Jeffrey Dean et al., "MapReduce: Simplifed Data Processing on Large Clusters," Google, Inc., pp. 1-13, 2004.
Avaya Inc., German Patent Application No. 10 2011 121 803.7, Communication dated Sep. 17, 2012, 3 pages.

* cited by examiner

*Primary Examiner* — Thjuan K Addy
(74) *Attorney, Agent, or Firm* — Maldjian Law Group LLC; John P. Maldjian, Esq.; Alexander D. Walter, Esq.

(57) ABSTRACT

Provided herein is a system and method for assigning a service contact from a customer to a service agent. The method may include: generating a customer information record from the service contact; producing a result set of eligible service agents by use of the customer information record; sorting the result set of eligible service agents based upon a predetermined criterion, to produce a sorted result set of eligible service agents; assigning a service agent from the sorted result set of eligible service agents, to produce an assigned service agent; and monitoring a communication channel for a refusal message from the assigned service agent. If a refusal message is received from the assigned service agent, then the method may further include: classifying the assigned service agent as ineligible; and assigning another service agent from the sorted result set of eligible service agents, to produce an assigned service agent.

18 Claims, 10 Drawing Sheets

SYSTEM AND METHOD FOR SEARCH-BASED WORK ASSIGNMENTS IN A CONTACT CENTER

BACKGROUND

1. Field of the Invention

Embodiments of the present invention generally relate to contact center agent assignment management and in particular to an improved system and method for assigning an agent to a customer as well as reassigning a customer contact to another agent if an initially matched agent is unable to accept the customer contact.

2. Description of Related Art

Call centers are commonly used by service providers or manufacturers (collectively, "vendors") to provide customer support. Customers requesting customer support may contact the call center by telephone. As additional methods of communication between agent and contact have been developed, such as e-mail, instant messaging, web chat, and so forth, call centers have evolved into contact centers in order to handle customer contact by a variety of methods, i.e., beyond telephone calls. In contact centers, quickly finding and assigning a well-qualified service agent to service a customer's need is important in providing improved customer satisfaction.

Traditional call centers, like Avaya™ CC-Elite™, route a customer's call to a service agent, having limited information about the customer beyond the telephone number called by the customer (the "called number"), and the telephone number of the customer (the "calling number"). The called and calling numbers are used to route the telephone call to one of several agent queues. The selection of the agent queue may be based upon a relatively simple routing strategy such as the shortest queue or the queue having been idle for the longest time.

The service agent assigned by this simple routing strategy may be ill-equipped to serve the customer, for instance the assigned service agent may not speak the customer's native language, or the assigned service agent may not have the required knowledge to address the customer's problem. This results in an inefficient use of time, the possibility of dropped calls as the customer's call is transferred to another service agent, and caller frustration as the caller is transferred from one service agent to another. In addition, the assigned service agent may be unfamiliar with any prior support calls placed by the customer, resulting in more inefficiency and caller frustration as the caller has to repeat previous support problems to the agent.

More recently deployed call centers may query the caller (e.g., by using interactive voice response (IVR)) about the nature of the call. This information may be used as additional information to route the call. For instance: "Press 1 for English; Press 2 for Spanish;" or "Press 1 for product 'A;'; Press 2 for product 'B'" would send the call to different queues with appropriate service agents answering the calls in the queues. This approach does not scale up well when the number of supported products is large, for instance. Although the assigned service agent is more likely to be qualified to help the customer, the assigned service agent may still be unfamiliar with any prior support calls placed by the customer.

Still other contact centers, like those from Genesys™ and heritage-Nortel™, provide contact center administrators with visual routing languages in order to create routing strategies. These routing strategies execute like small functional programs in order to find an appropriate service agent. Routing strategies may use a large amount of knowledge about the customer's contact to find a well-qualified service agent. The knowledge is gathered in a process called "qualification."

Qualification improves the choice of service agent, but at a greater performance or computing cost of executing the routing strategy. In these systems, the increased cost of choosing a more qualified service agent reduces the ability to scale up the solution. In addition, these systems typically have a small number of instances of routing strategy components. That is, each request for routing is handled by one instance or invocation of a software object or component that handles routing strategy.

Because each such instance or invocation uses a portion of the finite system computing resources available, a resource limitation limits the number of requests serviceable at any point in time. If the chosen service agent cannot serve the call for any reason (e.g., if the service agent is busy wrapping up work on a previous contact, or a different service agent is needed, etc.) the contact is re-queued and a new routing calculation must be made. This lengthens the time needed to respond to the customer.

Each known contact center routing method suffers drawbacks that affects speed of service, relevance of the service agent's skills, or scalability, and thus ultimately customer satisfaction. Therefore, there exists a need for most appropriate service agent to serve the customer's need in a way that can scale to very large numbers of service agents yet can be executed relatively efficiently.

SUMMARY

Embodiments of the present invention generally relate to a system and method for using the knowledge about a customer's reasons for contacting a contact center (i.e., vendor) in order to relatively increase the service agent selection process and serve the customer more effectively and efficiently, as well as to increase the service agent reassigning process if an initial assigned service agent is unable to accept the customer contact.

In one embodiment, a method to assign a service contact from a customer to a service agent comprises: generating a customer information record from the service contact; producing a result set of eligible service agents by use of the customer information record; sorting the result set of eligible service agents based upon a predetermined criterion, to produce a sorted result set of eligible service agents; assigning a service agent from the sorted result set of eligible service agents, to produce an assigned service agent; monitoring a communication channel for a refusal message from the assigned service agent; and, if a refusal message is received from the assigned service agent, then: classifying the assigned service agent as ineligible; and assigning another service agent from the sorted result set of eligible service agents, to produce an assigned service agent. Customer information records may be stored in files or databases.

In some embodiments, generating a customer information record further includes: generating a customer identification record from the service contact; and producing a customer history information record by use of the customer identification. In further embodiments, the customer history information record may include an identification of a service agent previously assigned to the customer, and/or an identification of a topic of a previous service contact from the customer.

In some embodiments, the predetermined criterion for sorting the result set of eligible service agents comprises an agent quality score and/or an agent service history.

In some embodiments, sorting the result set of eligible service agents includes performing a Map/Reduce process.

In other embodiments of the present invention, a communication system to assign a service contact from a customer to a service agent includes: a communication interface configured to receive the service contact from a customer; a customer information generation module configured to generate a customer information record from the service contact; a production module configured to produce a result set of eligible service agents by use of the customer information record; a sorting module configured to sort the result set of eligible service agents based upon a predetermined criterion, to produce a sorted result set of eligible service agents; an assignment module configured to assign a service agent from the sorted result set of eligible service agents, to produce an assigned service agent; a communication channel configured to receive a refusal message from the assigned service agent; and a reassignment module configured to classify the assigned service agent as ineligible and to assign another service agent from the sorted result set of eligible service agents, to produce an assigned service agent, wherein the reassignment module operates only if a refusal message from the assigned service agent is received on the communication channel.

In some embodiments, the customer information generation module further includes: a customer ID generation module configured to generate a customer identification record from the service contact; and a customer history information module configured to produce a customer history information record by use of the customer identification file.

In further embodiments, the customer history information module is further configured to produce an identification of a previous assigned service agent, and/or an identification of a topic of a previous service contact from the customer.

In some embodiments, the sorting module is configured to sort the result set of eligible service agents based upon an agent quality score and/or an agent service history.

In some embodiments, the sorting module operates by use of a Map/Reduce process.

In an alternative embodiments of the present invention, a communication system to assign a service contact from a customer to a service agent includes: a processor; and a memory coupled to the processor, the memory configured to store software that, when executed by the processor, performs: generating a customer information record from the service contact; producing a result set of eligible service agents by use of the customer information record; sorting the result set of eligible service agents based upon a predetermined criterion, to produce a sorted result set of eligible service agents; assigning a service agent from the sorted result set of eligible service agents, to produce an assigned service agent; monitoring a communication channel for a refusal message from the assigned service agent; and, if a refusal message is received from the assigned service agent, then: classifying the assigned service agent as ineligible; and assigning another service agent from the sorted result set of eligible service agents, to produce an assigned service agent.

BRIEF DESCRIPTION OF THE DRAWINGS

The above and still further features and advantages of the present invention will become apparent upon consideration of the following detailed description of embodiments thereof, especially when taken in conjunction with the accompanying drawings, wherein like reference numerals in the various figures are utilized to designate like components, and wherein.

DETAILED DESCRIPTION

Embodiments of the present invention generally relate to a system and method for contact center agent assignment management. Other embodiments of the present invention relate to a system and method for reassigning a customer contact if an initially assigned agent is unable or unwilling to accept the customer contact.

Although described in the context of a contact center, it is to be understood that this system and method is contemplated and within the scope of embodiments of the present invention to be applied to any system and method where agents, and more particularly service agents, whether human or automated, are called upon to assist multiple customers at any given time, either simultaneously or substantially simultaneously.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

Embodiments of the present invention are configured to accept and process an incoming customer contact at a contact center by use of one or more processing units coupled to one or more memories, as described below.

The memory may be configured in one embodiment to store software that, when executed by the processing unit, performs at least a "Qualification" process. The Qualification process extracts customer information from the customer contact, such as identity of the customer and why that customer initiated the customer contact.

The memory may be further configured to store a search repository in accordance with an embodiment of the present invention. The search repository may be configured as a database that is useful to store information pertaining to available service agents, such as service agent history, service agent quality scores, language abilities, areas of expertise, and the like. The search repository may further include information pertaining to customer history, such as a list of service agents who have previously worked with the customer in the past, the subject matter of previous contacts from this customer, and the like. The search repository may further store information such as administration data, and data from performance and analytical systems. The information from the search repository may be used to sort and produce the result set of service agents, as described below.

The memory may be further configured to store software that, when executed by the processing unit, performs a "Relevance Search" process. In an embodiment, the Relevance Search process calculates a prioritized set of service agents to service the customer contact, by use of information from the search repository such as the customer contact information that was obtained at the start of the customer contact. In general, a process that accepts an inquiry and characteristics about the inquiry, and then returns a prioritized set of resources that are qualified to address the inquiry, may be useful for implementing the Relevance Search process. Characteristics about the inquiry may include an identification of the inquiry (e.g., person or organization), the method of inquiry (e.g., telephone, web chat, email, etc.), other contact attributes (e.g., calling number, web page viewed, chat address, etc.), the subject matter, an importance ranking (either customer-supplied or system-determined), preferred language, and so forth. The memory may be further configured in an embodiment of the present invention to store software that, when executed by the processing unit, performs an "Agent State" process. The Agent State process receives the prioritized set of service agents produced by the Relevance Search process, and determines the highest ranked available service agent. The customer contact is then transmitted to the service agent so identified.

The service agent so identified by the Agent State process may refuse to accept the customer contact. For instance, the service agent may be unable to service the customer contact in a timely manner because the service agent may still be servicing a previous customer. Alternatively, the agent may be about to go on break or the agent may look at the contact information and decide he/she is not skilled enough, etc. In these situations, the customer contact should be rerouted to another service agent. Embodiments of the present invention are able to select the next highest ranked available service agent from the prioritized set of service agents, without necessarily a need to perform again the "Relevance Search" process. This saves processing time by avoiding unnecessary recalculations.

As used herein in connection with embodiments of the present invention, the term "contact" (as in "customer contact") refers to a communication from a customer or potential customer, in which a request is presented to a contact center. The request can be by way of any communication medium, such as a telephone call, e-mail, instant message, web chat, and the like.

As used herein, the term "qualification" or "qualifies" refers to a process step in which the contact center discerns information about the contact, such as the identity of the contact, and the reason the contact is contacting the contact center.

As used herein, the term "relevance search" refers to a search process that prepares a list of results that is prioritized according to some predetermined criteria, by use of information gathered from or determined from the customer contact.

As used herein, the term "search engine" refers to the part of the system that performs a relevance search.

As used herein, the term "criteria engine" refers to the part of the search engine that applies search criteria to order the result set of agents by priority.

As used herein, the term "Map/Reduce" refers to a highly-scalable relevance search algorithm as known to persons of skill in the art. In particular, one implementation of Map/Reduce maybe described at least in part by U.S. Pat. No. 7,650,331 to Dean et al., the entire content of which is hereby incorporated by reference in its entirety.

As used herein, the term "Hadoop" refers to an open-source version of Map/Reduce, as known to persons of skill in the art. Hadoop is a software system that supports data-intensive distributed applications. Hadoop enables applications to work with thousands of nodes and petabytes of data.

As used herein, the term "search repository" refers to the part of the contact center system containing information at least about agents including their attributes (e.g., language, areas of expertise, etc.)

As used herein, "priority" may indicate a quantification of the ability of an individual agent or other service provider to attend to the service contact. The ability may depend on factors such as how well the attributes of the content server (e.g., knowledge, skill, workload) matches or correlates with the attributes of the service contact (e.g., the type of service needed, subject matter).

As used herein in connection with embodiments of the present invention, the term "customer" denotes a party external to the contact center irrespective of whether or not that party is a "customer" in the sense of having a commercial relationship with the contact center or with a business represented by the contact center. "Customer" is thus shorthand, as used in contact center terminology, for the other party to a contact or a communications session.

The terms "switch," "server," "contact center server," or "contact center computer server" as used herein should be understood to include a Private Branch Exchange ("PBX"), an ACD, an enterprise switch, or other type of telecommunications system switch or server, as well as other types of processor-based communication control devices such as media servers, computers, adjuncts, and the like.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device which sends and receives data between devices. For example, a gateway may comprise routers, switches, bridges, firewalls, other network elements, and the like, any and combination thereof.

As used herein, the term "transmitter" may generally comprise any device, circuit, or apparatus capable of transmitting an electrical signal.

Figure 1:
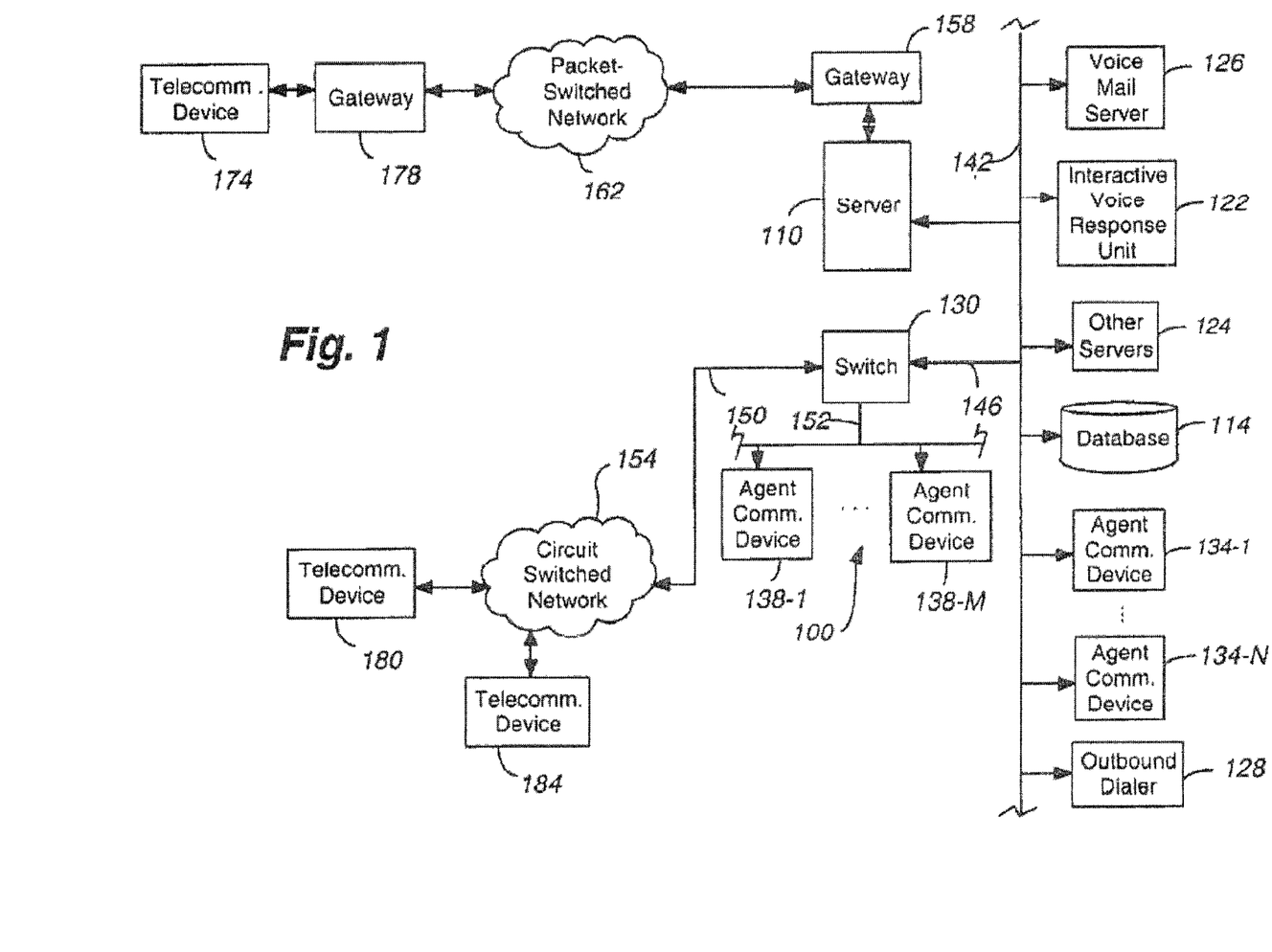
FIG. 1 is a block diagram depicting a contact center in accordance with an embodiment of the present invention.

Referring now to FIG. 1, which is a block diagram depicting a contact center in accordance with an embodiment of the present invention, there is provided a contact center 100. The contact center generally comprises a central server 110, a set of data stores or databases 114 containing contact or customer related information and other information that can enhance the value and efficiency of the contact, and a plurality of servers, for example, a voice mail server 126, an Interactive Voice Response unit or "IVR" 122, and other servers 124, an outbound dialer 128, a switch 130, a plurality of working agents operating packet-switched (first) telecommunication devices 134-1 to N (such as computer work stations or personal computers), and/or circuit-switched (second) telecommunication devices 138-1 to M, all interconnected by a local area network LAN (or wide area network WAN) 142. The servers can be connected via optional communication lines 146 to the switch 130.

As will be appreciated, the other servers 124 can also include a scanner (which is normally not connected to the switch 130 or Web server), VoIP software, video call software, voice messaging software, an IP voice server, a fax server, a web server, an instant messaging server, and an email server) and the like. The switch 130 is connected via a plurality of trunks 150 to the Public Switch Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

The gateway 158 may comprise Avaya Inc.'s, G250™, G350™, G430™, G450™, G650™, G700™, and IG550™ Media Gateways and may be implemented as hardware such as via an adjunct processor (as shown) or as a chip in the server.

The first telecommunication devices 134-1, . . . 134-N are packet-switched device, and may include, for example, IP hardphones, such as the Avaya Inc.'s, 1600™, 4600™, and 5600™ Series IP Phones™; IP softphones, such as Avaya Inc.'s, IP Softphone™; Personal Digital Assistants or PDAs; Personal Computers or PCs, laptops; packet-based H.320 video phones and/or conferencing units; packet-based voice messaging and response units; and packet-based traditional computer telephony adjuncts.

The second telecommunication devices 138-1, . . . 138-M are circuit-switched. Each of the telecommunication devices 138-1, . . . 138-M corresponds to one of a set of internal extensions, for example, Ext1, . . . ExtM, respectively. These extensions are referred to herein as "internal" in that they are extensions within the premises that are directly serviced by the switch. More particularly, these extensions correspond to conventional telecommunication device endpoints serviced by the switch/server, and the switch/server can direct incoming calls to and receive outgoing calls from these extensions in a conventional manner.

The second telecommunication devices can include, for example, wired and wireless telephones, PDAs, H.320 video phones and conferencing units, voice messaging and response units, and traditional computer telephony adjuncts. Exemplary digital telecommunication devices include Avaya Inc.'s 2400™, 5400™, and 9600™ Series phones.

It should be noted that embodiments of the present invention do not require any particular type of information transport medium between switch or server and first and second telecommunication devices, i.e., embodiments of the present invention may be implemented with any desired type of transport medium as well as combinations of different types of transport media.

The packet-switched network 162 of FIG. 1 may comprise any data and/or distributed processing network, such as the Internet. The network 162 typically includes proxies (not shown), registrars (not shown), and routers (not shown) for managing packet flows. The packet-switched network 162 is in (wireless or wired) communication with an external first telecommunication device 174 via a gateway 178, and the circuit-switched network 154 with an external (wired) second telecommunication device 180 and (wireless) third (customer) telecommunication device 184. These telecommunication devices are referred to as "external" in that they are not directly supported as telecommunication device endpoints by the switch or server. The telecommunication devices 174 and 180 are an example of devices more generally referred to herein as "external endpoints."

In one configuration, the server 110, network 162, and first telecommunication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized the configuration of the switch, server, user telecommunication devices, and other elements as shown in FIG. 1 is for purposes of illustration only and should not be construed as limiting embodiments of the present invention to any particular arrangement of elements.

As will be appreciated, the central server 110 is notified via LAN 142 of an incoming contact by the telecommunications component (e.g., switch 130, fax server, email server, web server, and/or other server) receiving the incoming contact. The incoming contact is held by the receiving telecommunications component until the server 110 forwards instructions to the component to route, and then forward the contact to a specific contact center resource, such as the IVR unit 122, the voice mail server 126, the instant messaging server, and/or first or second telecommunication device 134, 138 associated with a selected agent. The server 110 distributes and connects these contacts to telecommunication devices of available agents, based on the predetermined criteria noted above.

When the central server 110 forwards a voice contact to an agent, the central server 110 also forwards customer-related information from databases 114 to the agent's computer work station for viewing (such as by a pop-up display) to permit the agent to better serve the customer. The agents process the contacts sent to them by the central server 110. This embodiment is particularly suited for a Customer Relationship Management (CRM) environment in which customers are permitted to use any media to contact a business. In the CRM environment, both real-time and non-real-time contacts may be handled and distributed with equal efficiency and effectiveness. The server 110 may use a work assignment algorithm that, for example, does not use a queue. In any event, the contact may have associated or "known" contact information. This contact information may include, for example, how long the contact has been waiting, the contact's priority, the contact's media channel, the contact's business value, etc. The contact may be handled based on such known contact information.

The server and/or switch can be a software-controlled system including a processing unit (CPU), microprocessor, or other type of digital data processor executing software or an Application-Specific Integrated Circuit (ASIC) as well as various portions or combinations of such elements. The memory may comprise random access memory (RAM), a read-only memory (ROM), or combinations of these and other types of electronic memory devices. Embodiments of the present invention may be implemented as software, hardware (such as a logic circuit), or a combination thereof.

The contact center 100, in one configuration, includes an automated instant messaging server as another server 124. In such an embodiment, when a customer initiates contact with the contact center 100 using instant messaging, a new instant messaging thread is initiated by the customer. As will be appreciated, instant messages are stand-alone messages, and threading (or associating instant messages with data structures associated with an instant messaging session between a customer and an agent) occurs at the application level. The association is typically effected by pairing an electronic address (e.g., IP address, Media Access Control (MAC) address, telephone number, mobile-device identifier, and the like) of the customer's communication device with an electronic address (e.g., IP address, MAC address, telephone number, mobile-device identifier, and the like) of the agent's communication device in a manner similar to that used for a voice call.

The instant messaging server can be configured to send an automated response, such as "Please wait while I connect you with an agent" and/or to send the instant message to an automated interactive response unit for data collection. The instant messaging server subsequently notifies the server 110 of the existence of a new instant messaging contact, and the server 110 decides whether a suitable (human) agent is available. If an agent is available, the server 110 instructs the instant messaging server to redirect the instant messaging conversation to that available agent's communication device 134-1 . . . N. The server 110 routes, substantially in real-time, subsequent instant messages from the agent's communication device to the customer's communication device and from the customer's communication device to the agent's communication device.

Figure 2:
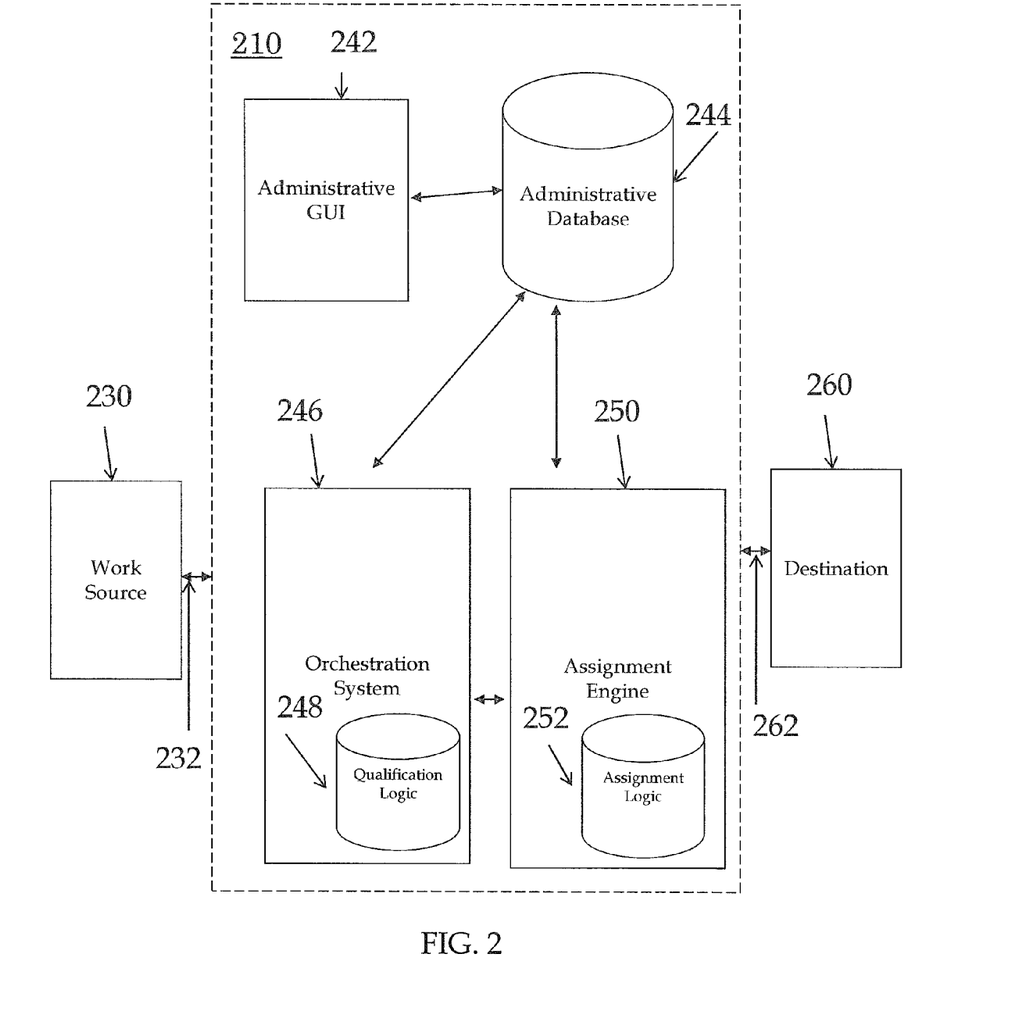
FIG. 2 is a system level block diagram depicting an administrator server in accordance with an embodiment of the present invention.

Referring to FIG. 2, which depicts a block diagram of a server 210 in accordance with an embodiment of the present invention, there is provided a server 210 is in communication with a work source 230, which may comprise customer or any other entity capable of originating a transmission of work or a contact. The server 210 may be configured to be in communication with the work source 230 generally via a work source communication means 232, which may comprise any means of communicating data, for example, one or more trunks, phone lines, wireless connections, Bluetooth connections, digital connections, analog connection, combinations thereof, and the like.

In some embodiments of the present invention, the server 210 may also be in communication with a destination 260, which may comprise an agent or any entity capable of receiving a transmission of work or a contact. The server 210 may be configured in communication with the destination 260 generally via an agent communication means 262, which may comprise any means of communicating data, for example, a voice-and-data transmission line such as LAN and/or a circuit switched voice line, wireless connections, Bluetooth connections, digital connections, analog connections, combinations thereof, and the like. The server 210 may comprise any type of computer server, for example, a Basic Call Management System ("BCMS") and a Call Management System ("CMS") capable of segmenting work.

The server 210 can be any architecture for directing contacts to one or more telecommunication devices. Illustratively, the server may be a modified in the form of Avaya Inc.'s Definity™ Private-Branch Exchange (PBX)-based ACD system, MultiVantage™ PBX, CRM Central 2000 Server™, Communication Manager™, Business Advocate™, Call Center™, Contact Center Express™, Interaction Center™, and/or 58300™, 58400™, 58500™, and 58700™ servers; or Nortel's Business Communications Manager Intelligent Contact Center™, Contact Center—Express™, Contact Center Manager Server™, Contact Center Portfolio™, and Messaging 100/150 Basic Contact Center™.

In many embodiments, the server 210 may be a stored-program-controlled system that conventionally includes, for example, interfaces to external communication links, a communications switching fabric, service circuits (e.g., tone generators, announcement circuits, and the like), memory for storing control programs and data, and a processor (i.e., a computer) for executing the stored control programs to control the interfaces and the fabric and to provide automatic contact-distribution functionality. The server 210 generally may include a network interface card (not shown) to provide services to the serviced telecommunication devices.

The server 210 may be configured for segmenting work in the contact center and may comprise an administrative database 244 configured to store at least a common skill option and a service skill option; an administrative graphical user interface ("GUI") 242 for accessing at least the administrative database 244 and configuring the common skill option and the service skill option; an orchestration system 246 configured to receive a contact from a work source 230 and orchestrate the contact according to a qualification logic stored in a qualification logic database 248; and an assignment engine 250 configured to receive the contact, the common skill option, and the service skill option, and segment the contact according to an assignment logic stored in an assignment logic database 252.

In accordance with some embodiments of the present invention, the qualification logic stored in the qualification logic database 248 and the assignment logic stored in the assignment logic database 252 may comprise any logical set of steps or sequences configured to process data at the call center in accordance with any embodiment of the present invention.

The server and/or switch can be a software-controlled system including a processing unit (CPU), microprocessor, or other type of digital data processor executing software or an Application-Specific Integrated Circuit (ASIC) as well as various portions or combinations of such elements.

Figure 3:
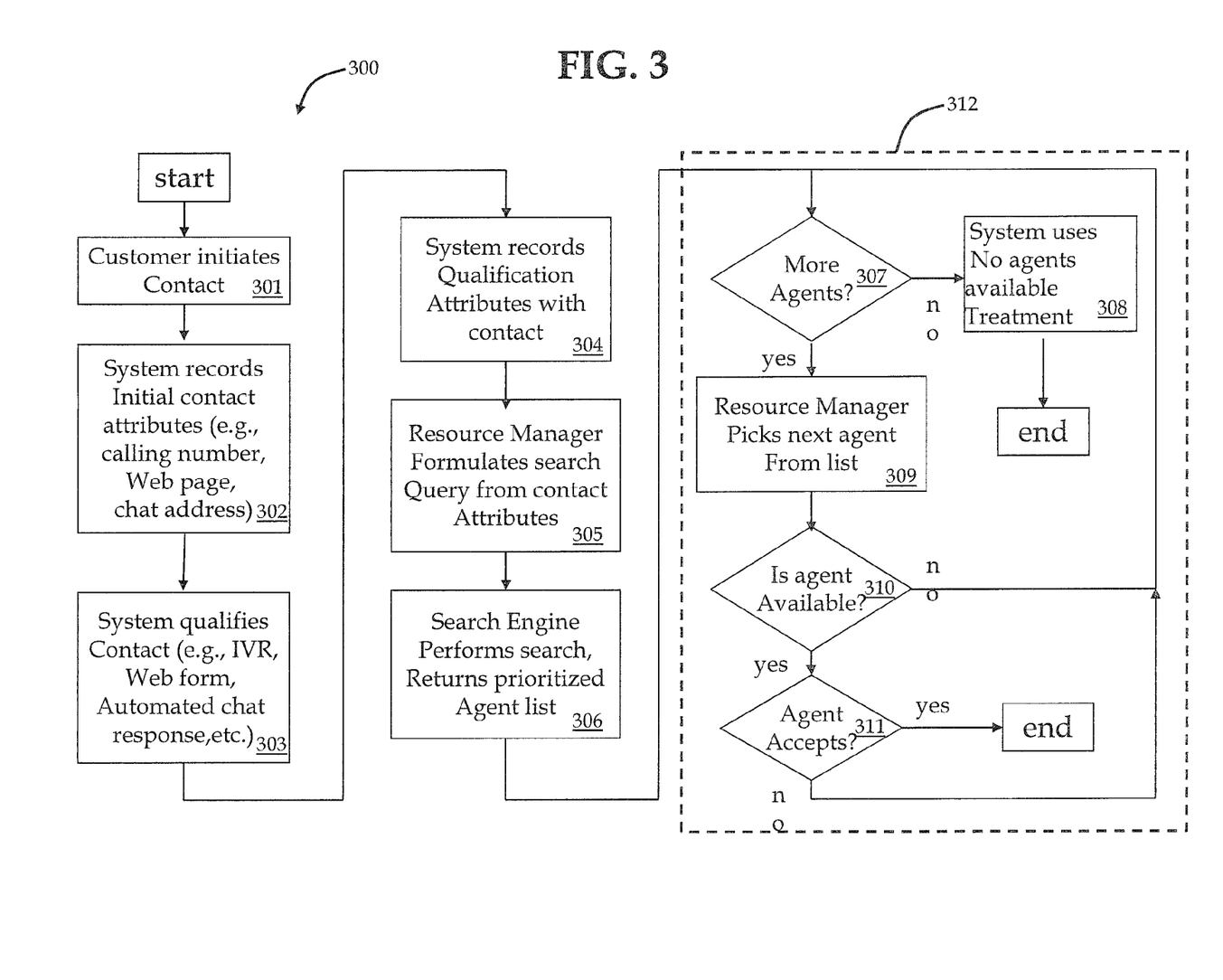
FIG. 3 is a flow chart depicting a method of operation of a search-based work assignment process in a contact center in accordance with an embodiment of the present invention.

FIG. 3 illustrates a process 300 at a high level of abstraction in accordance with an embodiment of the present invention. Process 300 begins at step 301 when a customer initiates a contact. The contact may be by any method such as, but not limited to, telephone call, email, instant message, web chat, and the like. The contact is routed to a contact center resource that is appropriate for the method of contact used, such as the voice mail server 126 of FIG. 1 for telephone calls.

Next, at step 302, process 300 records the initial contact attributes into a data repository such as database 114. Contact attributes may include information relevant to the manner of the contact, such as, but not limited to, the calling number, web page viewed, chat address, and the like.

Next, at step 303, process 300 "qualifies" the contact, during which the contact center discerns information about the contact, such as the identity of the customer who is contacting the vendor, and the purpose for contacting the vendor. The qualification information can be gathered, for instance, by an interactive voice response ("IVR") system, an automated chat response, a web form, and so forth. The information gathered may be stored into the data repository such as database 114.

Qualification may further include retrieving a service history associated with the customer who initiated the contact (e.g., previous problems; what agents previously interfaced with the customer, etc.), and/or retrieving a service related to the service or equipment for which the customer is contacting the contact center. Information retrieved may be read from the data repository such as database 114.

Next, at step 304, process 300 records the qualification attributes together with the contact information. This information is stored in a search repository such as database 114 for later access.

Next, at step 305, a resource manager formulates a search query from the contact attributes gathered in steps 302 and 303. The search query is passed along to step 306, at which a relevance search engine uses the search query in order to search for service agents that are qualified to handle the customer contact. The qualified service agents are then prioritized (i.e., ranked) according to one or more factors such as how well the skills of the agent matches with the problem for which the customer contacted the contact center, to produce a result set.

There may be a large number of agents who may be qualified to handle the customer contact. Furthermore, the number of incoming customer contacts from other customers may be large, and/or fluctuate significantly over time. Therefore, a relevance search process that is scalable in order to handle a varying demand and/or varying number of qualified agents, and that is able to operate quickly given a large number of customer contacts and service agents, is important to providing improved customer satisfaction.

At the conclusion of step 306, process 300 enters an Agent State sub-process 312. The Agent State sub-process receives the prioritized set of service agents produced by the relevance search of step 306, and determines the highest ranked available service agent. The customer contact is then transmitted to the service agent so identified. As shown in FIG. 3, steps 307 through 311 are steps within the Agent State sub-process 312.

At step 307, Agent State sub-process 312 (and thus also process 300 to which Agent State sub-process 312 belongs) determines whether there are any eligible service agents available, or still available, from the result set. If the answer is no, then control of process 300 passes through step 308 where certain final information is recorded. One would record the fact that the "no agents available treatment" was taken. That information could influence agent selection on the next contact from this customer, for example. Then, process 300 ends.

On the other hand, if the result of step 307 is that there is at least one available agent in the result set, then control of process 300 passes to step 309, at which a resource manager will pick an available agent from the result set. Ordinarily, the agent so picked will be the highest-ranking available agent. Step 310 determines whether the agent is available, for instance by examining the agent's pending workload, schedule, proficiency, etc. If the agent is not available, then the unavailability status is noted and control of process 300 returns to step 307 in order to select a different available agent.

However, if the agent is available, the agent is then asked at step 311 whether he or she accepts servicing the subject customer contact. If the agent accepts the customer contact, then process 300 successfully concludes. If the agent does not accept the customer contact, then a refusal message is sent from the service agent to the system performing process 300, via a communication channel, and then this agent is marked as unavailable, and control of process 300 returns to step 307 in order to select a different available agent. The agent can be marked as unavailable for some types of customer contacts, but not for others. For example, if the contact looks like it has large revenue potential, it may be decided to route the contact to an expert. The agent's status transitions back from unavailable to available by way of the agent activating a soft or hard "button" or other means to self activate change in status. Alternatively, available state may be inferred by activity at the agent desktop.

An advantage of process 300 is that if the selected agent is unavailable (step 310) or unwilling (step 311) to accept the service contact, then process 300 immediately loops back to select another agent (steps 307 and 309) without the need to recalculate and resort (step 306) the list of agents that are qualified to service the customer contact. Having to recalculate delays the process of selecting a matched agent for the contact and thus may lead to unacceptable wait time and customer dissatisfaction.

An embodiment of search and prioritization step 306 is now discussed in greater detail at a lower level of abstraction. Step 306 performs a relevance search process. In general, a process that accepts an inquiry, and optionally characteristics about the inquiry, and then returns a prioritized set of resources qualified to address the inquiry, may be useful for implementing the relevance search process.

Figure 4:
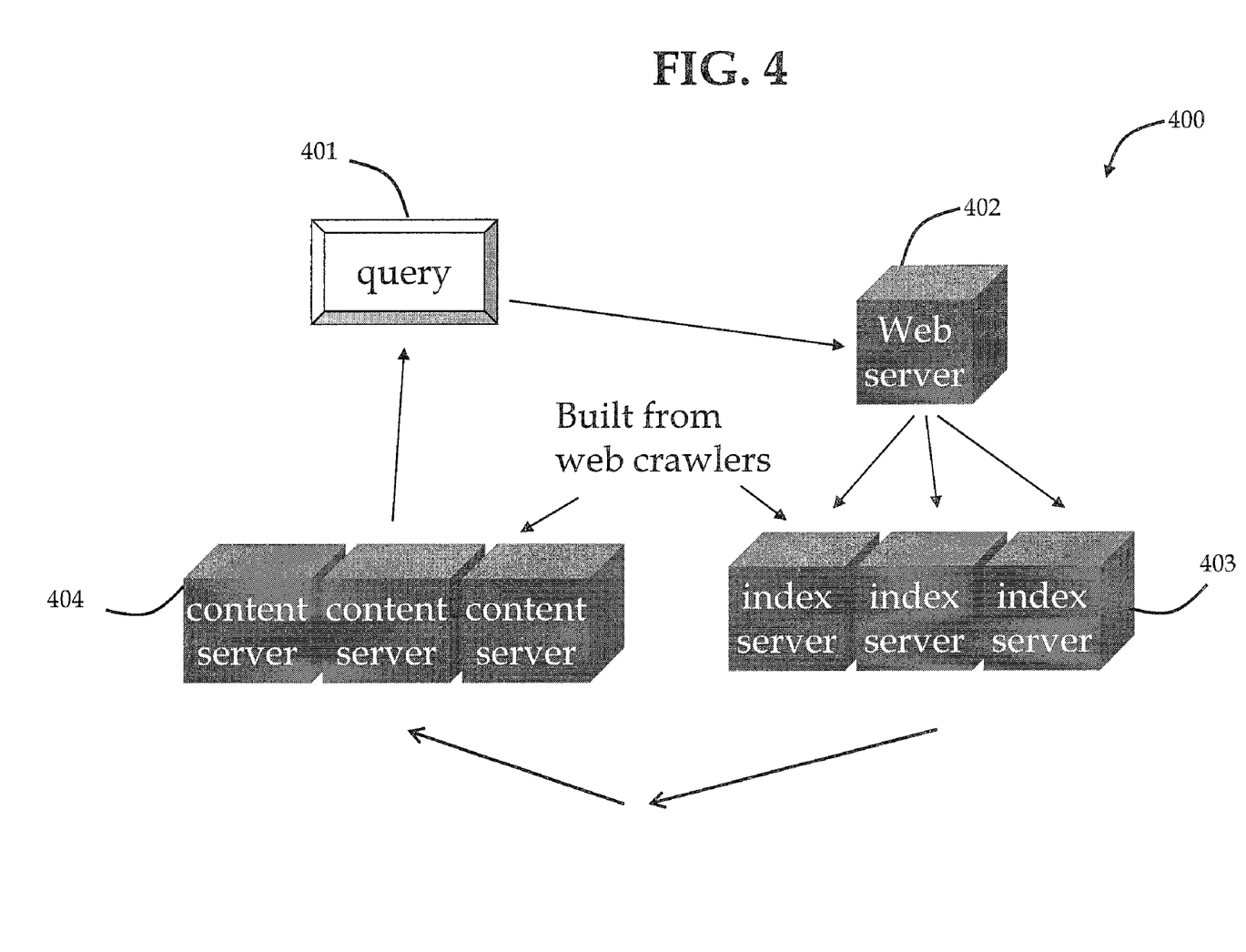
FIG. 4 is a relevance search system as used in connection with embodiments of the present invention.

For example, FIG. 4 illustrates an exemplary relevance search system 400. Relevance search system 400 is based upon a Map/Reduce system and process as described in U.S. Pat. No. 7,650,331 to Dean et al., the entire content of which is hereby incorporated by reference in its entirety. Map/Reduce is a process known by persons of skill in the art as being a highly scalable relevance search process.

Figure 5:
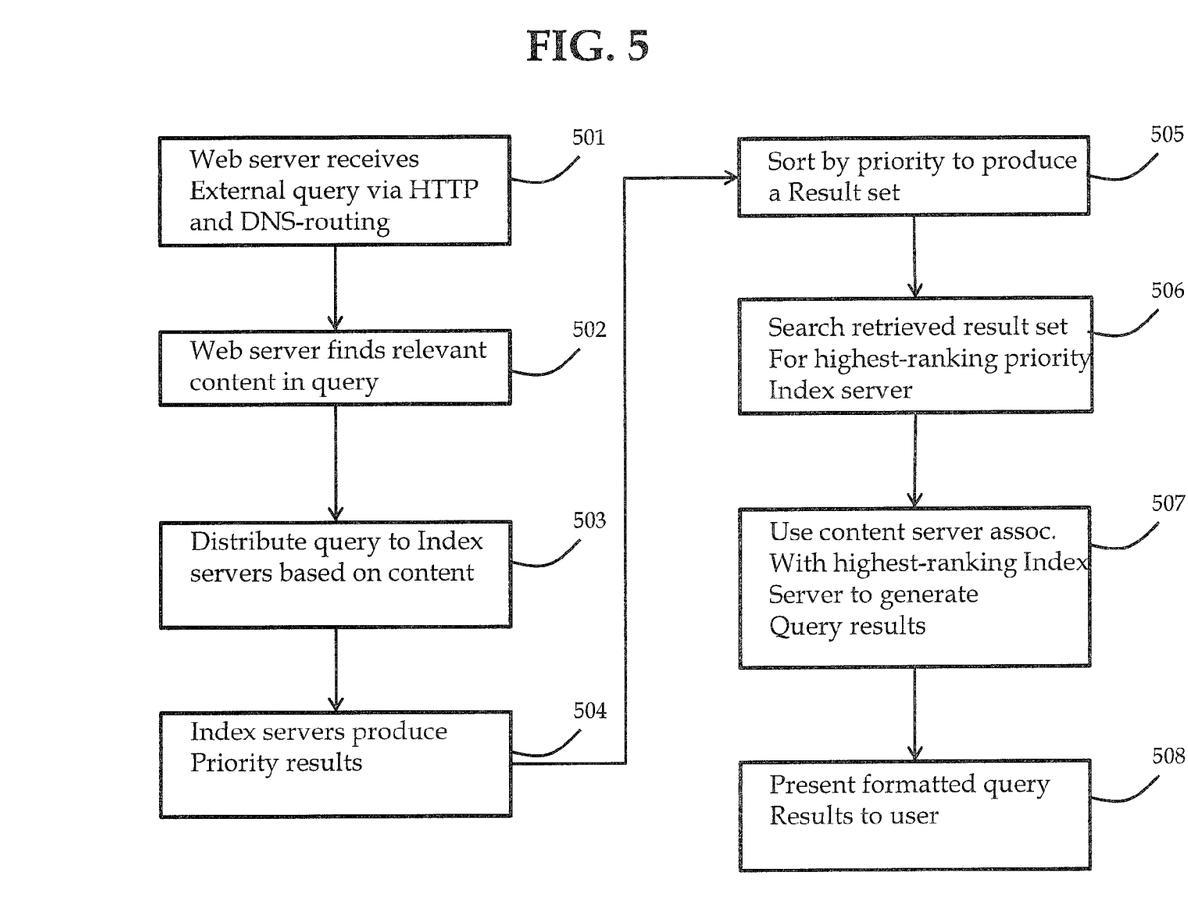
FIG. 5 is a flow chart depicting a method for operating the relevance search system of FIG. 4.

FIG. 5 illustrates a method of usage of system 400, to provide a relevance search process. A related process known in the art that maybe useful for implementing a search system is the Hadoop process (not illustrated), which is an open-source version of the system and method of FIGS. 4 and 5.

As used in a calling or contact center environment, a relevance search process that is scalable and fast is desirable, because there may be a large number of agents who may be qualified to handle the customer contact. Furthermore, the number of incoming customer contacts from other customers may be large, and/or fluctuate significantly over time.

Referring to FIGS. 4 and 5, in step 501, a web server 402 receives an external query from query-generator 401 via HTTP and DNS routing. Query-generator 401 may be, for example, a person connected to system 400 remotely over the internet. In step 502, web server 402 finds and extracts relevant content in the external query. Relevant content will be information from the external query, which will be useful in ranking the ability of a service agent to handle the external query. Examples of relevant content may include, but not be limited to, the identity of the customer, preferred language, the service or product the customer may be calling about, and so forth. Additional relevant content may be retrieved from a database, such as a customer history once the customer identity is known.

In step 503, the web server 402 distributes the external query to one or more index servers 403 based upon the relevant content. The index servers 403 that receive the external query may be selected on the basis of meeting a threshold requirement, such as proficiency in a foreign language. In step 504, the index servers 403 each produce a priority result that describes at least the ability of a content server 404, associated with a respective index server 403, to service the external query. In the context of contact center usage, the content server 404 may be deemed analogous to a service agent.

In step 505, the priority results from the index servers 403 are combined and sorted by priority in order to produce a sorted result set. In step 506, the index server 403 having the highest-ranking priority is identified. In step 507, the content server 404 associated with the highest-ranking index server 403 is used to produce a query result in response to the external query. In step 508, the query result is formatted and presented to the user.

In parallel with the process of FIG. 5, the index servers 403 and content servers 404 are maintained current, typically by use of a web crawler. A web crawler, as known in the art, is an autonomous process that searches for web pages on the internet by successively and recursively analyzing links in known web pages to discover and analyze additional web pages indicated by those links. Web crawlers are mainly used to create a copy of all the visited pages for later processing by a process that will index the downloaded pages to provide fast searches. Web crawlers are generally known as processes that run continuously in the background or in parallel with other processes. By use of a web crawler to maintain current the index servers 403 and content servers 404, it is possible to frequently update servers 403, 404 given the large population of service agents that would be typical of a contact center, and the concomitant frequent change and update of service agent attributes.

The Map/Reduce system and process of FIGS. 4 and 5 is configured to operate based on a query from a remote user, and returning results to the remote user. However, step 306 of process 300, as disclosed and described in FIG. 3, does not rely upon direct human interaction, but rather relies upon inter-process communication. Therefore, referring to FIG. 6, there is illustrated an alternate embodiment of relevance search system 400, based on the Map/Reduce system and process, but modified to interface as part of a larger system by use of inter-process communication messages.

Figure 6:
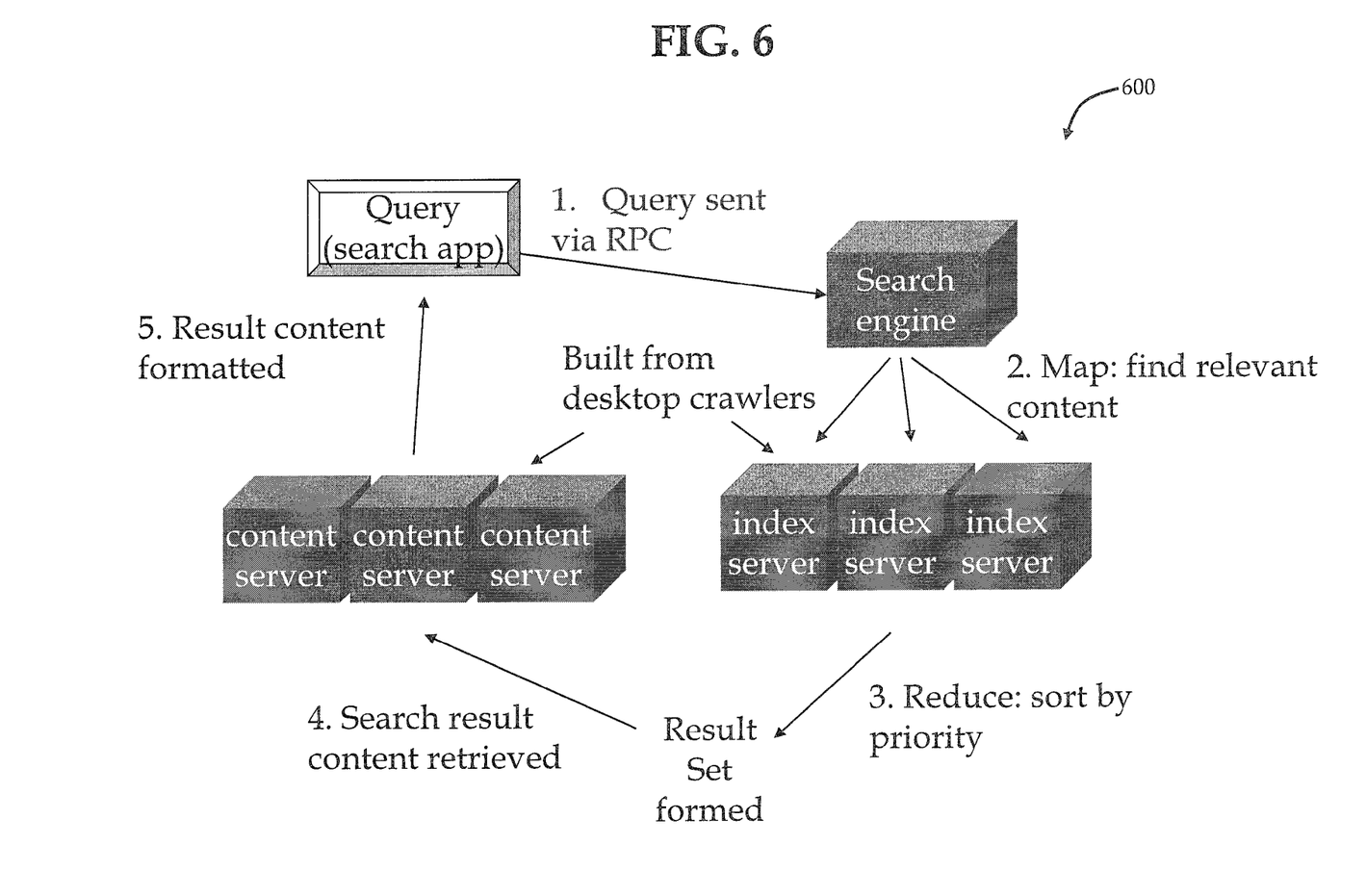
FIG. 6 is a block diagram depicting an embodiment of a relevance search system, modified to interface as part of a larger system by use of interprocess communication messages.

System 600 is similar to system 400, except at least that a query is received via a remote process call ("RPC"), that the Relevance Search may be initiated locally or over a LAN rather than over the internet, and that the content servers and the index servers are built from desktop or LAN crawlers, but not necessarily web crawlers. In contrast, the Relevance Search of system 400 is initiated remotely via HTTP and DNS routing, and the indices are built from web crawlers. In addition, system 400 has no privacy issue to deal with because if a web site is visible, it is not private. In system 600, desktop crawlers must recognize private data and not index it.

As discussed above in connection with FIG. 4, crawlers are generally known as processes that run continuously in the background or in parallel with other processes. By use of a crawler to maintain current the index servers and content servers, it is possible to frequently update the servers given the large population of service agents that would be typical of a contact center, and the concomitant frequent change and update of service agent attributes.

Figure 7:
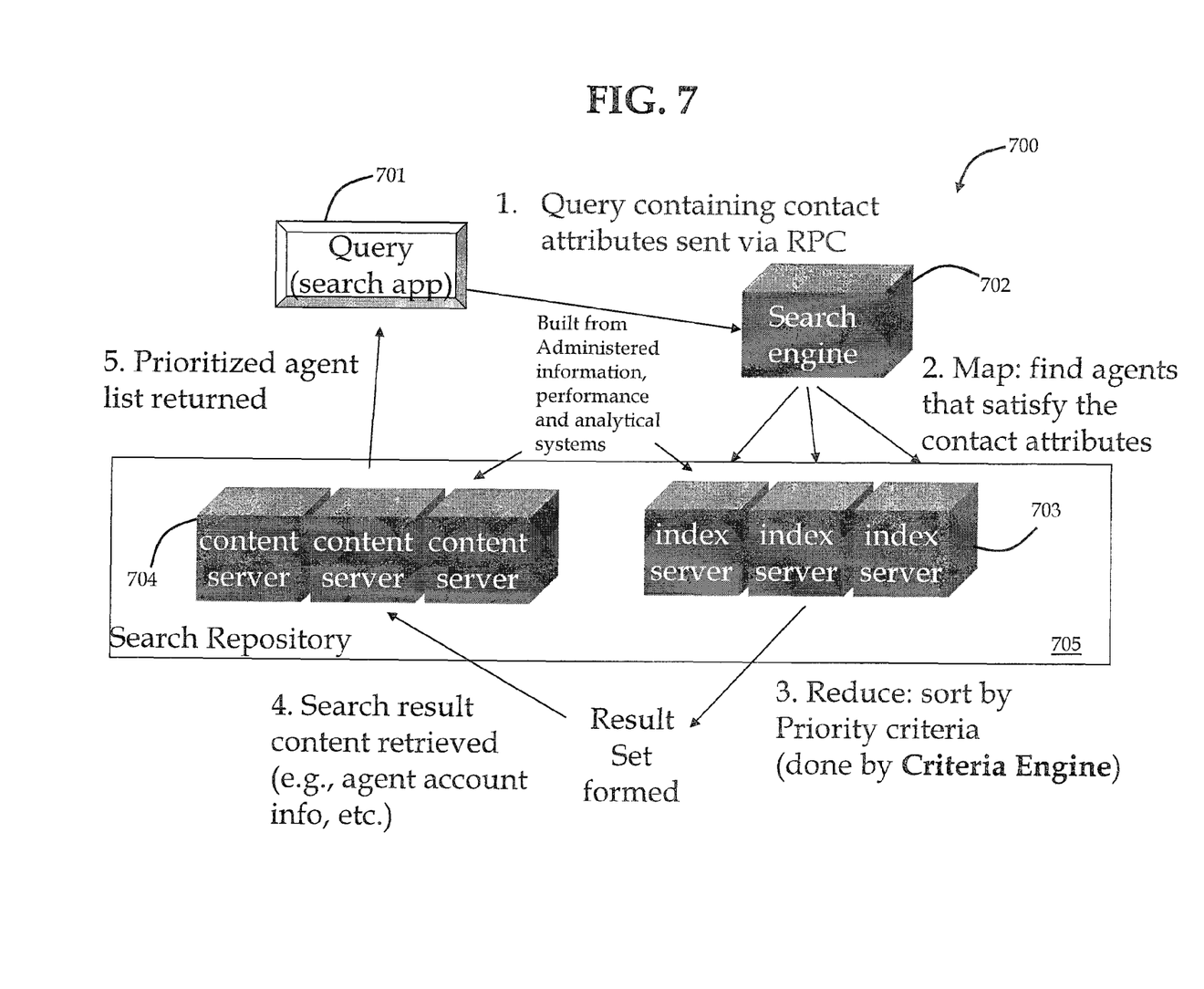
FIG. 7 is a block diagram depicting an embodiment of a subsystem for performing a relevance search in a contact center environment.
Figure 8:
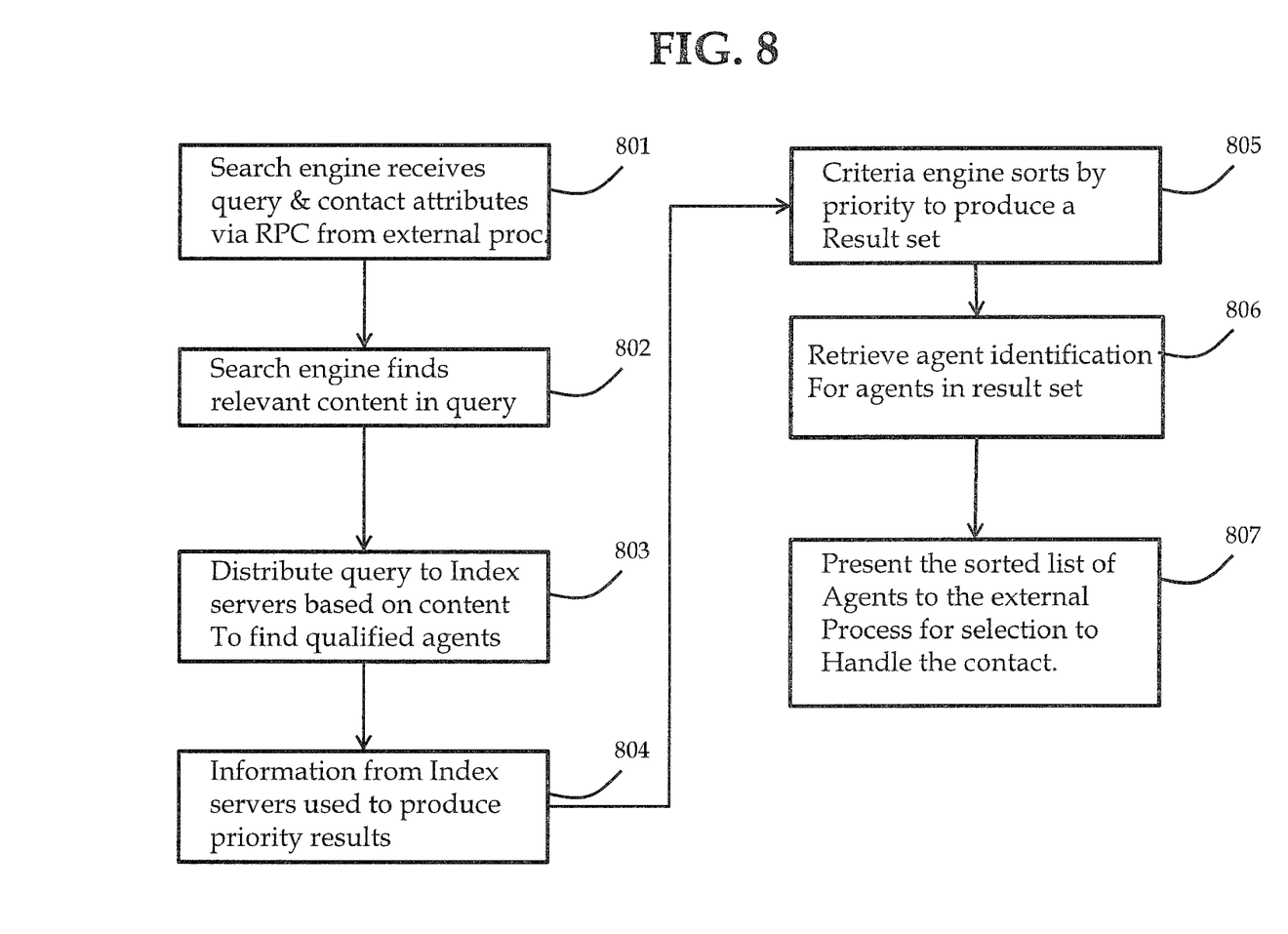
FIG. 8 is a flow chart depicting a method for operating the embodiment of a subsystem for performing a relevance search in a contact center environment of FIG. 7.

Referring now to FIG. 7, there is illustrated an embodiment of a subsystem 700 for performing a relevance search in a contact center environment. More specifically, subsystem 700 can be adapted to implement the relevance search referred to in step 306 of process 300 of FIG. 3, in accordance with an embodiment of the present invention. FIG. 8 illustrates a corresponding method for implementing a relevance search by use of subsystem 700 in a contact center environment. Although FIGS. 7 and 8 are illustrated based upon the Map/Reduce process for calculating Search Relevance, it should be understood that the process is not limited in this regard, and that alternate processes can be used to return a prioritized set of relevant agents, as discussed above in connection with FIG. 4.

In subsystem 700, a search engine 702 is configured to receive, from a query source 701, a query containing contact attributes. This corresponds to step 801 of FIG. 8. Search engine 702 may operate as a daemon background process. Contact attributes may be related to the manner of the contact, such as the calling number, web page viewed, chat address, and the like. At step 802 of FIG. 8, contact attributes are extracted from the query. At step 803, search engine 702 communicates with index servers 703, using the contact attributes it extracted from the query, in order to determine an initial set of service agents that are qualified to handle the service request.

After the initial set of qualified service agents is determined, priority criteria is determined at step 804 of FIG. 8 for substantially each qualified service agent. The priority criteria may numerically indicate how well the service agent should be able to service the query, for instance, by how well the skills, knowledge, and workload of the service agent match or correlate to the estimated skills, knowledge, and time needed to service the query. In one embodiment of the invention, the priority criteria may be calculated by the search engine 702 as qualified agents are identified. In an alternate embodiment of the invention, the priority criteria may be calculated by a criteria engine (discussed below) as part of the sub-process of sorting qualified agents by priority. It is typical for the map step to include relevant criteria and the map step to order based on priorities. Other arrangements are possible particularly if M/R is not being used.

At step 805, the qualified service agents are sorted (i.e., ranked) in order of priority criteria, by the criteria engine, in order to create a priority result set. At step 806, identification information for agents on the priority result set is retrieved. This corresponds in FIG. 7 to retrieving information from content server 704 based upon the sorted result set, a content server 704 corresponding to a service agent. At step 807, the sorted priority result set is returned from subsystem 700. This also completes step 306 of process 300 of FIG. 3.

Index servers 703 and content servers 704 ordinarily are stored within search repository 705. Index servers 703 and content servers 704 are derived from, and maintained by, administration information (e.g., agent identification information), performance systems (e.g., agent quality metrics), and analytical systems (e.g., analysis of skills needed and/or available).

Given the large number of service agents staffing a typical contact center, service agent information may change frequently or even substantially continuously. Therefore, the index servers 703 and content servers 704 should be updated frequently. In one embodiment of the present invention, the administration information, performance systems and analytical systems may be implemented as background daemon processes running on one or more processors in the contact center. In another embodiment of the present invention, the administration information, performance systems and analytical systems may be updated on demand by an administrator using a process as shown in FIG. 9 and/or FIG. 10, as described in further detail below.

Figure 9:
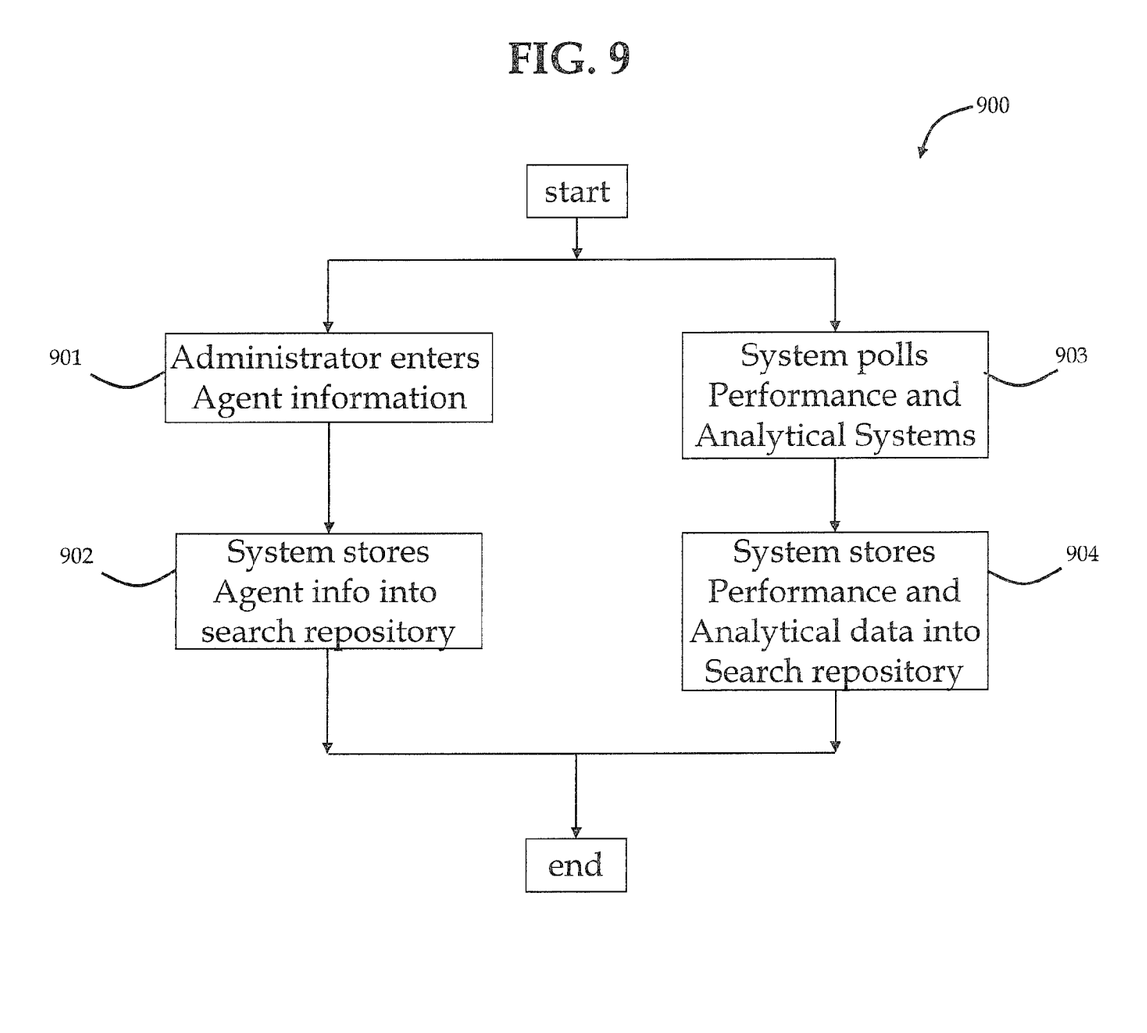
FIG. 9 is a flow chart depicting a method to create, update and maintain a search repository.

FIG. 9 illustrates an ancillary process 900 to create, update and maintain search repository 705. Agent identification information can be created or updated by an administrator who enters agent information at step 901, and then, at step 902, the system stores that updated information into the search repository 705. With respect to performance and analytical systems, at step 903 the system polls the performance and analytical systems, and then at step 904 the system stores that updated information into the search repository 705.

Figure 10:
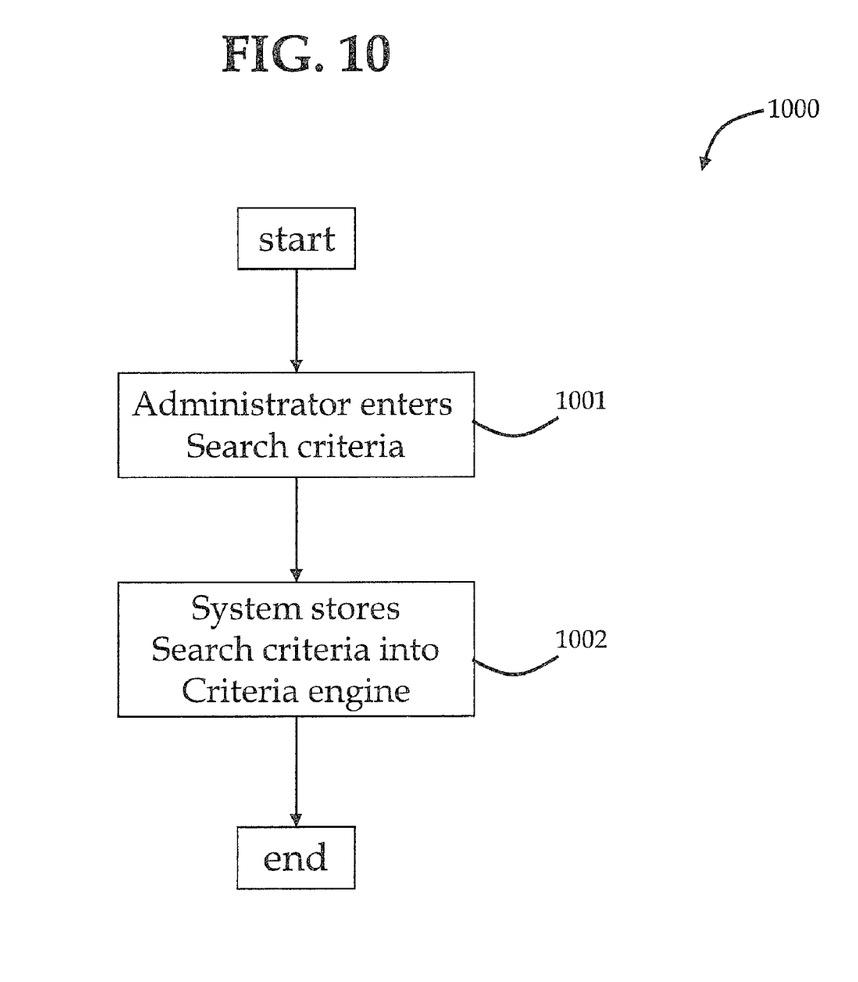
FIG. 10 is a flow chart depicting a process for criteria engine administration in accord with embodiments of the present invention.

Referring now to FIG. 10, there is illustrated a process 1000 for criteria engine administration in accordance with embodiments of the present invention. At step 1001 an administrator enters search criteria (e.g., language proficiency of an individual agent), and at step 1002 the system stores the search criteria into a memory associated with the criteria engine. Existing criteria may be edited or deleted by a similar process (not shown).

While the foregoing is directed to embodiments of the present invention, other and further embodiments of the invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the present invention.

No element, act, or instruction used in the description of the present application should be construed as critical or essential to the invention unless explicitly described as such. Also, as used herein, the article "a" is intended to include one or more items. Where only one item is intended, the term one or similar language is used. Further, the terms any of followed by a listing of a plurality of items and/or a plurality of categories of items, as used herein, are intended to include "any of," "any combination of," "any multiple of," and/or any combination of multiples of the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶ 6, and any claim without the word "means" is not so intended.

What is claimed is:

1. A method to assign a service contact from a customer to a service agent, comprising:
    generating a customer information record from the service contact;
    producing a result set of eligible service agents by use of the customer information record;
    sorting the result set of eligible service agents based upon a predetermined criterion, to produce a sorted result set of eligible service agents;
    assigning a service agent from the sorted result set of eligible service agents, to produce an assigned service agent;
    monitoring a communication channel for a refusal message from the assigned service agent; and
    if a refusal message is received from the assigned service agent, then:
        classifying the assigned service agent as ineligible; and
        assigning another service agent from the sorted result set of eligible service agents, to produce an assigned service agent.

2. The method of claim 1, wherein the step of generating a customer information record further comprises:
    generating a customer identification record from the service contact; and
    producing a customer history information record by use of the customer identification file.

3. The method of claim 1, wherein the step of sorting the result set of eligible service agents comprises a Map/Reduce process.

4. The method of claim 1, wherein the assigned service agent comprises the highest-ranked eligible service agent.

5. The method of claim 2, wherein the customer history information record comprises an identification of a service agent previous assigned to the customer.

6. The method of claim 2, wherein the customer history information record comprises an identification of a topic of a previous service contact from the customer.

7. The method of claim 1, wherein the predetermined criterion for sorting the result set of eligible service agents comprises an agent quality score.

8. The method of claim 1, wherein the predetermined criterion for sorting the result set of eligible service agents comprises an agent service history.

9. A communication system to assign a service contact from a customer to a service agent, comprising:
    a processor; and
    a memory coupled to the processor, the memory configured to store software that, when executed by the processor, performs:
        generating a customer information record from the service contact;
        producing a result set of eligible service agents by use of the customer information record;
        sorting the result set of eligible service agents based upon a predetermined criterion, to produce a sorted result set of eligible service agents;
        assigning a service agent from the sorted result set of eligible service agents, to produce an assigned service agent;
        monitoring a communication channel for a refusal message from the assigned service agent; and
        if a refusal message is received from the assigned service agent, then perform:
            classifying the assigned service agent as ineligible; and
            assigning another service agent from the sorted result set of eligible service agents, to produce an assigned service agent.

10. The communication system of claim 9, wherein the step of sorting the result set of eligible service agents comprises a Map/Reduce process.

11. A communication system to assign a service contact from a customer to a service agent, comprising:
    a communication interface configured to receive the service contact from a customer;
    a customer information generation module configured to generate a customer information record from the service contact;
    a production module configured to produce a result set of eligible service agents by use of the customer information record;
    a sorting module configured to sort the result set of eligible service agents based upon a predetermined criterion, to produce a sorted result set of eligible service agents;
    an assignment module configured to assign a service agent from the sorted result set of eligible service agents, to produce an assigned service agent;
    a communication channel configured to receive a refusal message from the assigned service agent; and
    a reassignment module configured to classify the assigned service agent as ineligible and to assign another service agent from the sorted result set of eligible service agents, to produce an assigned service agent,
    wherein the reassignment module operates only if a refusal message from the assigned service agent is received on the communication channel.

12. The communication system of claim 11, wherein the customer information generation module further comprises:
    a customer ID generation module configured to generate a customer identification record from the service contact; and
    a customer history information module configured to produce a customer history information record by use of the customer identification file.

13. The communication system of claim 11, wherein the sorting module operates by use of a Map/Reduce process.

14. The communication system of claim 11, wherein the assignment module is configured to assign the highest-ranked eligible service agent as the assigned service agent.

15. The communication system of claim 12, wherein the customer history information module is further configured to produce an identification of a previous assigned service agent.

16. The communication system of claim 12, wherein the customer history information module is further configured to produce an identification of a topic of a previous service contact from the customer.

17. The communication system of claim 11, wherein the sorting module is configured to sort the result set of eligible service agents based upon an agent quality score, to produce a sorted result set of eligible service agents.

18. The communication system of claim 11, wherein the sorting module is configured to sort the result set of eligible service agents based upon an agent service history, to produce a sorted result set of eligible service agents.

* * * * *